United States Patent [19]

Sommerfeld et al.

[11] 4,298,724
[45] Nov. 3, 1981

[54] BRANCHED POLYESTERS FOR ADHESIVES AND COATING COMPOSITIONS

[75] Inventors: Eugene G. Sommerfeld, Penn Valley; Paul R. Noyes, Philadelphia, both of Pa.

[73] Assignee: E. I. DuPont de Nemours and Company, Wilmington, Del.

[21] Appl. No.: 123,069

[22] Filed: Feb. 20, 1980

[51] Int. Cl.$^3$ .............................................. C08G 63/18
[52] U.S. Cl. .................................................... 528/302
[58] Field of Search ......................... 528/302, 308, 309

[56] References Cited

U.S. PATENT DOCUMENTS

| | | | |
|---|---|---|---|
| 3,803,098 | 4/1974 | Schmitt et al. | 528/309 X |
| 3,808,160 | 4/1974 | Steinmetz et al. | 260/16 |
| 3,888,908 | 6/1975 | Cross et al. | 528/302 X R |
| 4,151,152 | 4/1979 | Schmitt et al. | 260/33.6 UB |
| 4,201,859 | 5/1980 | Agarwal | 528/302 |
| 4,205,115 | 5/1980 | Piccirilli et al. | 428/334 |
| 4,232,090 | 11/1980 | Simon | 428/424.4 |

FOREIGN PATENT DOCUMENTS 856731 12/1960 United Kingdom .

OTHER PUBLICATIONS

Van Krevelen, D. W. et al., Properties of Polymers Elsevier Scientific Publishing Co., N.Y. (1976), pp. 17–20.

*Primary Examiner*—Lucille M. Phynes
*Attorney, Agent, or Firm*—James H. Ryan

[57] ABSTRACT

Described are diol/higher polyol/aromatic acid/aliphatic acid branched polyesters of carefully controlled composition highly soluble in cheap, nontoxic organic solvents and suitable as components of adhesives, e.g., for bonding flexible plastics, and as components of organic coatings.

10 Claims, No Drawings

BRANCHED POLYESTERS FOR ADHESIVES AND COATING COMPOSITIONS

BACKGROUND OF THE INVENTION

1. Field of the Invention

This invention relates to novel branched chain polyesters of carefully controlled composition which are highly soluble in cheap, nontoxic, organic solvents and suitable as components of adhesives and of coating materials.

2. Prior Art

British Pat. No. 856,731 (1960) shows polyesters made from terephthalic-isophthalic acid, ethylene glycol and pentaerythritol, or 1,1,1-trimethylolpropane, etc.

Steinmetz U.S. Pat. No. 3,808,160 (1974) shows polyesters which may be made from mixtures of polyols and polyacids.

Schmitt et al. U.S. Pat. No. 4,151,152 (1979) shows varnishes based on polyesters containing mainly dicarboxylic acids with diols and/or triols.

The various polymer parameters used in this application, e.g., $\overline{M}_n$, $\overline{M}_w$, $\overline{M}_z$, etc., are well known and disclosed in texts on polymers, for example, D. W. van Krevelen, "Properties of Polymers," 2nd ed., Elsevier, New York, 1976 (pp. 17-18).

SUMMARY OF THE INVENTION

The present invention comprises novel, highly branched, hydroxyl-containing polyesters formed from moieties of (1) diol(s), (2) higher polyol(s), (3) aromatic acid(s) and (4) aliphatic acid(s). The mole ratios between (1) and (2), (3) and (3) plus (4), and (1) plus (2) and (3) plus (4) are rigidly controlled.

The polyesters may be synthesized by mixing all ingredients, heating them directly and distilling off water. Alternatively, catalyzed transesterification may be employed using the methyl esters of the acids and distilling off methanol.

Within their carefully controlled compositional limits, the polyesters are soluble at high solids content in cheap, nontoxic organic solvents and serve, in combination with polyisocyanates, as excellent adhesives, particularly for flexible polymers such as poly(ethylene terephthalate). They also have unusual utility in thermosetting coatings with aminoplasts and the like. Because of the high solids content of the products, air pollution from solvent emission is minimized.

THE INVENTION IN DETAIL

In accordance with the present invention, branched polyesters can be made by directly reacting at least four reactants: (1) a diol, (2) a polyol containing three or more hydroxyl groups used as a branching agent, (3) a dibasic aromatic acid, and (4) a dibasic aliphatic acid. Mixtures of two or more or any or all of the respective four ingredients are, of course, usable. These ingredients are all known to the art: cf. the patents cited for usable materials. The proportions of all ingredients must be carefully controlled, however, if the purposes of this invention are to be achieved, i.e., the production of high-solids polyesters for use in adhesives, particularly with flexible polymeric substrates, and for use with aminoplasts in thermosetting coatings.

Diols (1) usable here have 2-14 carbons in the chain and include ethylene glycol, 1,4-butanediol, 1,2- and 1,3-propanediol, 1,4-cyclohexanedimethanol, neopentylglycol, polyethylene glycol, etc.

Triols or higher polyols (2), the branching agents, preferably have 3-14 carbons in the chain and include glycerine, trimethylolpropane, pentaerythritol, trimethylolethane, 1,2,6-hexanetriol, etc.

Aromatic (3) and aliphatic (4) acids usable include succinic acid, adipic acid, glutaric acid, azelaic acid, sebacic acid, terephthalic acid, isophthalic acid, phthalic acid, etc. Anhydrides of these acids may be substituted for the acids. Furthermore, the lower alkyl esters of all these acids are usable in the alternative method of preparation, transesterification, discussed below.

Essential to the invention is rigid control of mole ratios in the product determined by the ratios of the charged reactants. The first ratio of importance is:

$$X_1 = \frac{\text{Total Moles of Polyol}}{\text{Total Moles of Polyacid}}$$

Normalizing the denominator of this ratio to 1, the ratio is always greater than 1, indicating the required excess of hydroxyl over carboxyl groups. The usable ratio $X_1$, is then found to lie in the range 1.25-1.8, with the range 1.3-1.6 being preferred.

The second ratio is:

$$X_2 = \frac{\text{Moles of Diol}}{\text{Moles of Higher Polyol}}$$

Here, the usable range is 0.8-1.5, with 0.8-1.3 being preferred.

The third ratio is:

$$X_3 = \frac{\text{Moles of Aromatic Acid}}{\text{Moles of Total Acid}}$$

With a denominator of 1, this range has an extreme upper limit of about 0.80 and a lower limit of about 0.3. High aromaticity may be desired particularly for bonding polyester plastics, e.g., poly(ethylene terephthalate). If $X_3$ is raised above about 0.8, the product is unusable. If the triol proportion is too low, however ($X_2$ greater than about 1.5), the product is insufficiently branched to exhibit the desired properties. The proportion of aromatic acid, $X_3$, is usually about 0.50-0.65 but, as noted, may be as low as 0.30.

An additional fact should be noted about the three ratios $X_1$, $X_2$ and $X_3$. If all are at their extremes at the same time, gelation may occur. For example, if $X_3$ is at about 0.80, indicating a high proportion of aromatic acid, at least one and preferably both of the other two ratios should be away from their extremes and preferably near the mid-points of their ranges.

While the terms "acid" and "polyacid," etc., are used to define the moieties in the ratios $X_1$ and $X_3$, it will be understood that the moieties need not be derived directly from the acids. Thus the moieties may derive from the anhydrides of the acid mentioned or, by evolution of an alcohol, from the lower alkyl ester in a transesterification process.

The molecular weights $\overline{M}_n$, $\overline{M}_w$ and $\overline{M}_z$ and their ratios are also important but are basically determined by the reactants and preparation. All are exactly defined by D. W. van Krevelen, loc. cit., whereby:

$\overline{M}_n$ is the number average molecular weight,
$\overline{M}_w$ is the weight average molecular weight, and $\overline{M}_z$ is the z average molecular weight.

All of these may be determined by gel permeation chromatography.

The products of this invention may be prepared by the fusion method, removing water in direct esterification. The reaction vessel is charged with all ingredients and heated in the range of about 160°–260° C. with removal of water as the reaction proceeds to yield a product with an acid number of less than 5 or, often, less than 1. A fractionating column is usually used to separate and return the higher boiling glycol to the batch.

In an alternative procedure, transesterification is employed using lower alkyl esters such as methyl esters rather than acids. In this process, an alcohol rather than water is removed. A transesterification catalyst such as an organometallic compound of tin, zinc, manganese, calcium, titanium or the like is required in this procedure, but it is otherwise similar to direct esterification.

The novel polyesters so prepared are much more soluble in common organic solvents of low toxicity than linear polyesters. For example, linear polyesters having a terephthalic acid concentration greater than 18–19% by weight are insoluble in common solvents of low toxicity. In many cases of initial dissolution, precipitation or crystallization occurs with time. Usable and desirable nontoxic organic solvents include methyl ethyl ketone (MEK), methyl isobutyl ketone (MIBK), acetone, dimethyl sulfoxide, isophorone, butyl carbitol, N-methyl pyrrolidone, diacetone alcohol, lower alkyl ethers of ethylene glycol and acetates, lower alkyl ethers of diethylene glycol and acetates, lower alkyl acetates and the like. Solutions, e.g., in methyl ethyl ketone, of 60–85% by weight of solids, or even higher, are readily produced and are sufficiently fluid at normal temperatures to be usable in high-solids adhesives, a concentration of 65–75% being preferred (see Examples 11, 12 and 13, below). Mixtures of such solvents are, of course, usable.

Adhesives with nontoxic solvents are particularly important in avoiding air pollution by the evaporation of solvent and are useful in meeting statutory pollution standards. The adhesives may be used to bond any conventional substrates, e.g., metal-to-metal, metal-to-wood, wood-to-wood, plastic-to-metal, plastic-to-plastic, etc. Because they are flexible, they are particularly valuable in bonding flexible resins, e.g., poly(ethylene terephthalate).

When used in adhesives, the present hydroxyl-containing polyesters may be crosslinked by isocyanate crosslinkers such as toluene diisocyanate (TDI), 4,4'-methylene-bis(diphenyl diisocyanate), the 5/2 molar adduct of TDI and trimethylolpropane, the 2/1 molar adduct of TDI and diethylene glycol, 1,6-hexamethylene diisocyanate, and the like. The crosslinking agent will generally constitute about 3–25% of the total weight of solids. Solutions of polyesters and crosslinkers constitute part of this invention.

The products of this invention are also useful as coating compositions, which may be clear or pigmented as will be readily understood. They may conveniently be employed in coating compositions with aminoplasts (amino resins) such as urea-formaldehyde and melamine-formaldehyde resins and their (lower) alkoxy derivatives, benzoguanamine, hydantoin, phenoplasts (phenol-formaldehyde resins), epoxies, etc. (see Example 14, below). The polyester/aminoplast ratios in such compositions extend from about 95/5 to 60/40. Mixtures of the polyesters and aminoplasts, i.e., solutions in organic solvents of about 60–85% total solids, also form part of the invention, as do the cured coatings.

The present polyesters may readily be recovered from solution by evaporating the solvent. They are normally straw-colored to amber rubbery solids.

There follow some examples illustrating the invention in more detail. In these examples, unless otherwise noted, pressures are ambient atmospheric, temperatures are in degrees centigrade, and ratios, parts and percentages are in terms of weight. Molecular weights were determined by gel permeation chromatography. Viscosities are generally given on the Gardner-Holdt (G-H) scale (room temperature). Mole ratios, $X_1$, $X_2$ and $X_3$ are as defined above.

EXAMPLE 1

Esterification

Into a 5-liter flask equipped with stirrer, fractionating column, water separator, condenser, thermometer, nitrogen sparge and electrical heater, was charged the following:

| Ingredient | Weight (g) |
| --- | --- |
| Trimethylolethane | 1087.14 |
| Ethylene glycol | 656.06 |
| Terephthalic acid | 1003.49 |
| Isophthalic acid | 627.23 |
| Azelaic acid | 994.73 |
|  | 4368.63 |

The mole ratios corresponding to this charge are: $X_1 = 1.30$; $X_2 = 1.17$; $X_3 = 0.65$.

With thorough stirring, heat was turned on and refluxing was continued for 4–5 hours, beginning at about 153° and rising to a high of 265°. 543.57 g of $H_2O$ was collected as distillate. Heat was turned off, a small sample was taken for analytical purposes, and methyl ethyl ketone solvent (675.01 g) was poured into the hot polyester product to give an 85% by weight solution. Molecular weights were determined by gel permeation chromatography: $\overline{M}_n = 3,000$; $\overline{M}_w = 13,500$; and $\overline{M}_z = 41,800$. Other characteristics were: acid number (A.N.) = 0.62, hydroxyl number (H.N.) = 242; G-H viscosity $Z6\frac{1}{2}$ at 85% solids in MEK. The product was a clear material very soluble in various organic solvents and useful as an adhesive.

EXAMPLES 2–7

A series of runs was made following generally the procedure of Example 1 but differing at times in obvious particulars, e.g., in the size of the charge, reaction vessel, physical manipulations, etc. The compositions and mole proportions with the sum of the moles of all acids normalized to 1 were as follows:

| Example | Triol or Higher | Diol | Aromatic Acid | Aliphatic Acid |
| --- | --- | --- | --- | --- |
| 2A | TMP = 0.60 | EG = 0.70 | T = 0.40; I = 0.25 | A9 = 0.35 |
| 3 | TMP = 0.60 | EG = 0.70 | I = 0.65 | A9 = 0.35 |
| 4 | TMP = 0.60 | EG = 0.70 | T = 0.40; I = 0.25 | A6 = 0.20; A9 = 0.15 |
| 5 | TMP = 0.60 | EG = 0.70 | T = 0.65 | A9 = 0.35 |
| 6 | TMP = 0.55; PE = 0.15 | EG = 0.75 | T = 0.40; I = 0.40 | A6 = 0.10; A9 = 0.10 |
| 7 | 1,2,6-hexane- | EG = 0.70 | T = 0.40; | A6 = 0.35 |

-continued

| Example | Triol or Higher | Diol | Aromatic Acid | Aliphatic Acid |
|---------|-----------------|------|---------------|----------------|
|         | triol = .60     |      | I = 0.25      |                |

TMP = trimethylolpropane
EG = ethylene glycol
T = terephthalic acid
I = isophthalic acid
A6 = adipic acid
A9 = azelaic acid
PE = pentaerythritol Characteristics of the clear products were as follows:

EXAMPLE 2

A. $X_1 = 1.30$, $X_2 = 1.17$, $X_3 = 0.65$; $\overline{M}_n = 3,100$, $\overline{M}_w = 14,800$, $\overline{M}_z = 45,700$; A.N. = 1.35; H.N. = 242; G-H viscosity = Z6-½, 85% solids in MEK.

B. Demonstrating viscosity as a percentage of solids, a polyester of the same composition as in A but with original G-H viscosity of Z5+¼ at 85% solids in MEK was diluted. To the 85% solution in MEK were added equal proportions of MEK and MIBK to give solutions of 55, 65 and 75% solids.

Brookfield viscosities at 25° C. were:

| 55%   | 65%    | 75%     |
|-------|--------|---------|
| 65 cp | 210 cp | 1138 cp |

EXAMPLE 3

$X_1 = 1.30$, $X_2 = 1.17$, $X_3 = 0.65$; $\overline{M}_n = 3,200$, $\overline{M}_w = 15,000$, $\overline{M}_z = 45,000$; A.N. = 0.66; H.N. = 247; G-H viscosity = Z5+½, 85% solids in MEK.

EXAMPLE 4

$X_1 = 1.30$, $X_2 = 1.17$, $X_3 = 0.65$; $\overline{M}_n = 2,500$, $\overline{M}_w = 10,000$, $\overline{M}_z = 28,000$; A.N. = 0.85; H.N. = 255; G-H viscosity = Z5+¾, 85% solids in MEK.

EXAMPLE 5

$X_1 = 1.30$, $X_2 = 1.17$, $X_3 = 0.65$; $\overline{M}_n = 2,600$, $\overline{M}_w = 14,000$, $\overline{M}_z = 47,000$; A.N. = 1.0; H.N. = 232; G-H viscosity = Z6+¾, 85% solids in MEK.

EXAMPLE 6

$X_1 = 1.30$, $X_2 = 1.17$, $X_3 = 0.65$; $\overline{M}_n = 3,900$, $\overline{M}_w = 16,000$, $\overline{M}_z = 40,000$; A.N. = 3.51; H.N. = 215; G-H viscosity = Z5+½, 85% solids in MEK.

Control Runs

Two runs were made close to but outside the limits of the invention as follows:

| Run | Triol or Higher | Diol      | Aromatic Acid          | Aliphatic Acid |
|-----|-----------------|-----------|------------------------|----------------|
| A   | G = 0.60        | EG = 0.60 | T = 0.33; I = 0.17     | A9 = 0.50      |
| B   | TMP = 0.45      | EG = 0.75 | T = 0.43; I = 0.07     | A9 = 0.50      |

G = Glycerine

In Run A, $X_1 = 1.20$, $X_2 = 1.00$ and $X_3 = 0.5$. Here, $X_1$ was below its minimum. The product gelled and was unusable for an adhesive.

In Run B, $X_1 = 1.20$, $X_2 = 1.67$ and $X_3 = 0.50$. Here, $X_1$ is again below the minimum and $X_2$ is above its extreme limit. The polyester gelled and was unusable.

EXAMPLES 7–10

Transesterification

A series of runs was carried out using the dimethyl esters of dibasic aromatic and aliphatic acids rather than the acids directly, methanol being distilled off. The equipment and procedure employed were substantially the same as in Examples 1–6 except that esterification catalysts were required.

EXAMPLE 7

The following was charged into a 1-liter flask equipped with stirrer, condenser, heater, etc:

| Ingredient            | Weight (g) |
|-----------------------|------------|
| Trimethylolpropane    | 198.65     |
| Ethylene Glycol       | 107.19     |
| Dimethyl Terephthalate| 287.36     |
| Dimethyl Azelate      | 213.38     |
|                       | 806.58     |

The mole ratios were $X_1 = 1.30$, $X_2 = 1.17$ and $X_3 = 0.60$. Zinc acetate (0.20% by weight) was added as catalyst and the stirred charge was heated. Distillation began at about 173° and was continued for 7½ hours, the temperature rising to 261°. A total of 157.89 g of methanol was distilled off. Heating was discontinued and, when the temperature of the batch had dropped to 200° (in about 10 minutes), 114.70 g of MEK was added over 5 minutes. The cooled (room temperature) product was a viscous liquid suitable in adhesives: $\overline{M}_n = 3,900$, $\overline{M}_w = 23,000$, $\overline{M}_z = 72,000$; A.N. = 3.16; G-H viscosity = Z6-¼, 85% solids in MEK.

EXAMPLE 8

In a substantial repetition of Example 7 except that dibutyltin oxide (0.20%) was substituted for zinc acetate as catalyst, a polyester product very soluble in MEK and useful in adhesives was obtained: $M_n = 6,300$, $M_w = 17,000$, $M_z = 25,000$; A.N. = 3.16; H.N. = 188; G-H viscosity = Z7, 85% solids in MEK.

EXAMPLE 9

Example 7 was substantially repeated except that the aromatic esters charged were dimethyl terephthalate (0.40 mole) and dimethyl isophthalate (0.25 mole), the aliphatic ester was dimethyl azelate (0.35 mole), and the catalyst was 0.20% calcium acetate. The polyester product was soluble in organic solvents and useful in adhesives: $X_1 = 1.30$, $X_2 = 1.17$, $X_3 = 0.65$; $M_n = 3,700$, $M_w = 18,000$, $M_z = 54,000$; A.N. = 2.16; H.N. = 236; G-H viscosity = Z7, 85% solids in MEK.

EXAMPLE 10

Example 9 was substantially repeated except that 0.20% zinc acetate was substituted for calcium acetate as catalyst. The clear product was very soluble in organic solvents: $M_n = 2,900$, $w_2 = 9,000$, $M_z = 23,000$; A.N. = 2.05; H.N. = 244; G-H viscosity = Z4+½, 85% solids in MEK.

EXAMPLES 11-13

Adhesives

EXAMPLE 11

The composition from Example 2A was blended with MEK and methyl isobutyl ketone and an isocyanate crosslinker (21% solids on polyester solids of Mondur ® CB-75 (trademark of Mobay Chemical Company)) to application solids of 65%, viscosity #3 Zahn 25 seconds. Mondur ® CB-75 is the 5/2 molar product of toluene diisocyanate and trimethylolpropane supplied at 75% solids in ethyl acetate. The diluted material was coated onto 48LBT Mylar ® (trademark of E. I. duPont de Nemours and Company) poly(ethylene terephthalate) film and laminated to medium density polyethylene (MDPE) film by means of a Faustel Model TT coater-laminator, Faustel, Inc., Butler, Wis. The following conditions were maintained throughout the test

| | |
|---|---|
| Cylinder | 200 Quad |
| Oven Temp | 93° C. |
| Speed | 30 ft/min |
| Coater Nip | 50 psi |

Laminating nip roll temperature and pressure were varied according to the table below. Coating weight was determined to be 1.3 lbs/3000 ft². 180° (angular) peel strengths were determined using an Instron "C" cell at 25° with a crosshead speed of 12 in/min.

| Run No. | Nip Roll Conditions | | Peel Strength lb/in | | | |
|---|---|---|---|---|---|---|
| | Temp °C. | Pressure (psi) | Green | 1 Day | 3 Days | 7 Days |
| 1 | 66 | 20 | 2.87 | 0.43 | 1.32 | 3.40 |
| 2 | 66 | 60 | 3.58 | 2.10 | 3.65 | 3.22 |
| 3 | 79 | 20 | 1.80 | 1.80 | 3.38 | 3.42 |
| 4 | 79 | 60 | 1.97 | 2.47 | 2.27 | 3.83 |
| 5 | 93 | 20 | 2.93 | 3.60 | 3.98 | 3.62 |
| 6 | 93 | 60 | 2.23 | 4.00 | 4.02 | 3.48 |

EXAMPLE 12

The composition from Example 3 was blended with Mondur ® CB-75 at levels of 12, 15 and 17% solids on polyester solids and the three solutions diluted to 65% solids with MEK and MIBK. Coating equipment and conditions were the same as in Example 11 except that the laminating nip roll was kept at 93° and 40 psi. Solution viscosity was 99 seconds using a #2 Zahn cup. Coating weight average was 1.6 lb/3000 ft². The solution was coated onto 92 LB Mylar ® polyester film and laminated to MDPE.

Peel tests were done as in Example 12 with these results:

| | Peel Strength lb/in | | | |
|---|---|---|---|---|
| % Mondur ® CB-75 | Green | 1 Day | 3 Days | 7 Days |
| 12 | 1.78 | 1.10 | 1.25 | 1.25 |
| 15 | 2.08 | 2.05 | 2.35 | 2.38 |
| 17 | 2.47 | 2.77 | 2.93 | 3.00 |

EXAMPLE 13

The composition from Example 4 was blended with Mondur ® CB-75 at 3 levels and each blend was diluted with MEK and MIBK to 65% application solids (#2 Zahn cup viscosity=75 seconds; coating weight about 0.9 lb/3000 ft²). Substrates and machine conditions were those of Example 12.

Peel tests were done as in Example 11 with these results:

| | Peel Strength lb/in | | | |
|---|---|---|---|---|
| % Mondur ® CB-75 | Green | 1 Day | 3 Days | 7 Days |
| 15 | 2.68 | 2.73 | 3.12 | 3.06 |
| 20 | 3.03 | 0.10 | 0.47 | 0.42 |
| 25 | 2.70 | 0.65 | 0.78 | 0.70 |

EXAMPLE 14

Aminoplast Coating Composition

A. A polyester with the same composition as that shown in Example 2 with a G-H viscosity of Z6-½, 85% solids in MEK, and a weight of 9.7 lb/gal was blended with hexamethoxymethylmelamine (Cymel ® 301, trademark of American Cyanamid Company), at these ratios of polyester solids to Cymel ® 301: 60/40, 70/30 and 85/15.

All blends were catalyzed with 0.5% p-toluenesulfonic acid, doctor-oladed onto Bonderite ® 1000 (trademark of Parker Rustproofing Company) steel panels and baked for 20 minutes at 177° C. All films were clear with a pencil hardness of 3H-4H, and showed good resistance to MEK in a solvent rub test.

B. A white mill base with a pigment to binder ratio of 307/100 was prepared by mixing in order the materials listed below and then passing the mixture through a sand grinder:

| | |
|---|---|
| Polyester (as in A) | 23.5 parts |
| M-P-A ® MS* anti-settling polymeric resin (50% in mineral spirits) | 2.0 parts |
| Butyl Acetate | 9.5 parts |
| Titanium Dioxide | 65.0 parts |

*M-P-A ® MS is a multipurpose thixotropic agent sold by N.L. Industries.

C. A white enamel with a pigment to binder ratio of 100/100 and a polyester/Cymel ® 301 ratio of 70/30 was prepared by mixing in order:

| | |
|---|---|
| Mill Base (from B) | 154.0 parts |
| Polyester (as in A) | 59.0 parts |
| Cymel ® 301 | 30.0 parts |
| p-toluenesulfonic acid* (adduct with epoxy resin) | 10.0 parts |
| Butyl Acetate | 20.0 parts |

*p-TSA content at 0.05 parts per 100 parts of polyester plus Cymel ® 301 solids.

The enamel so prepared had a solids content of 75% by volume, #5 Zahn viscosity of 40 seconds at 18° and a resistivity of 20,000 ohm-cm.

D. The white enamel from C was sprayed onto Bonderite ® 1000 steel panels and baked for 23 minutes at 163°. The films had high gloss (94 at 16° (angular)) good hiding, good flexibility (80 in-lb indirect bump rating), good adhesion to substrate, and good recoat adhesion. The pencil hardness was 4H-5H. Rubbing with MEK did not affect appearance. There was no slumping at 1.6 mil dry film thickness.

We claim:

1. A hydroxyl-containing polyester, soluble to the extent of at least 65% by weight in methyl ethyl ketone, formed from at least four different organic moieties:

(1) at least one diol moiety having 2-14 carbons;
(2) at least one triol or higher polyol moiety having 3-14 carbons;
(3) at least one dibasic aromatic acid moiety; and
(4) at least one dibasic aliphatic acid moiety, the mole ratio $X_1$ of total polyol to total polyacid being in the range 1.25/1 to 1.8/1, the mole ratio $X_2$ of diol to higher polyol being in the range of 0.8/1 to 1.5/1, and the mole ratio $X_3$ of aromatic acid to total acid being in the range 0.3/1 to 0.8/1, not all of $X_1$, $X_2$ and $X_3$ being at their extremes simultaneously.

2. A polyester of claim 1 wherein:
(1) is ethylene glycol;
(2) is at least one of trimethylolpropane, glycerine, pentaerithrytol, 1,2,6-hexanetriol and trimethylolethane;
(3) is at least one phthalic acid; and
(4) is at least one of adipic and azelaic acids.

3. The polyester of claim 1 wherein:
(1) is ethylene glycol;
(2) is trimethylolpropane;
(3) is terephthalic and isophthalic acids; and
(4) is azelaic acid, $X_1$ being 1.3.

4. The polyester of claim 3 wherein $X_1=1.3$, $X_2=1.17$ and $X_3=0.65$.

5. The polyester of claim 1 wherein:
(1) is ethylene glycol;
(2) is 1,2,6-hexanetriol;
(3) is terephthalic and isophthalic acids; and
(4) is adipic acid.

6. The process of preparing a polyester of claim 1 which comprises reacting together:

(1) at least one diol having 2-14 carbons;
(2) at least one triol or higher polyol having 3-14 carbons;
(3) at least one dibasic aromatic acid, anhydride, or lower alkyl ester thereof; and
(4) at least one dibasic aliphatic acid, anhydride, or lower alkyl ester thereof, provided that when a lower alkyl ester is used, a transesterification catalyst is also used, the mole ratio $X_1$ of total polyol to total polyacid being in the range 1.25/1 to 1.8/1, the mole ratio $X_2$ of diol to higher polyol being in the range 0.8/1 to 1.5/1, and the mole ratio $X_3$ of aromatic acid to total acid being in the range 0.3/1 to 0.8/1, not all of $X_1$, $X_2$ and $X_3$ being at their extremes simultaneously.

7. The process of claim 6 wherein the reactants are refluxed together.

8. The process of claim 7 wherein:
(1) is ethylene glycol;
(2) is trimethylolpropane;
(3) is terephthalic and isophthalic acids; and
(4) is azelaic acid.

9. The process of claim 7 wherein:
(1) is ethylene glycol;
(2) is 1,2,6-hexanetriol;
(3) is terephthalic and isophthalic acids; and
(4) is adipic acid.

10. The process of claim 7 wherein:
(1) is ethylene glycol;
(2) is trimethylolpropane;
(3) is dimethyl terephthalate; and
(4) is dimethyl azelate.

* * * * *